(12) United States Patent
Dani et al.

(10) Patent No.: US 8,700,542 B2
(45) Date of Patent: Apr. 15, 2014

(54) RULE SET MANAGEMENT

(75) Inventors: Mohan N. Dani, Bangalore (IN);
Tanveer A. Faruquie, New Delhi (IN);
Hima P. Karanam, New Delhi (IN); L. Venkata Subramaniam, Gurgaon (IN);
Girish Venkatachaliah, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 12/969,497

(22) Filed: Dec. 15, 2010

(65) Prior Publication Data

US 2012/0158619 A1 Jun. 21, 2012

(51) Int. Cl.
*G06F 17/30* (2006.01)
(52) U.S. Cl.
USPC .......................................................... 706/12
(58) Field of Classification Search
USPC .......................................................... 706/12
See application file for complete search history.

(56) References Cited

U.S. PATENT DOCUMENTS

| 2003/0061242 | A1* | 3/2003 | Warmer et al. ............... 707/200 |
| 2005/0276262 | A1 | 12/2005 | Schuba et al. |
| 2008/0154837 | A1 | 6/2008 | Morimura et al. |
| 2009/0144217 | A1 | 6/2009 | Bergsten et al. |
| 2009/0172800 | A1 | 7/2009 | Wool |
| 2010/0100954 | A1 | 4/2010 | Yang |
| 2012/0166412 | A1* | 6/2012 | Sengamedu et al. .......... 707/709 |

* cited by examiner

*Primary Examiner* — Jeffrey A Gaffin
*Assistant Examiner* — Ola Olude Afolabi
(74) *Attorney, Agent, or Firm* — Shimokaji & Assoc., P.C.

(57) ABSTRACT

Systems, methods, and computer products for optimally managing large rule sets are disclosed. Rule dependencies of rules within a set of rules may be determined as a function of rules execution frequency data generated from applying the rules over a data set. The rules within the set of rules may be clustered into rules clusters based on the determined rule dependencies, in which the rules clusters comprise disjoint subsets of the rules within the set of rules. Cluster frequency data for the rules clusters may be used to arrive at an optimal ordering. Each rule within the set of rules may be assigned a unique identification that may capture an execution order of the rules within the set of rules.

21 Claims, 7 Drawing Sheets

RULE SET MANAGEMENT

BACKGROUND

The present invention relates to knowledge acquisition systems, and more specifically, to systems, methods, and computer products for optimally managing large rule sets.

Knowledge acquisition systems may be useful for capturing knowledge in the form of rules that may be used by the system to support the making of decisions or even to make decisions. Once encoded, rules can provide consistent answers for repetitive decisions, processes, and tasks.

As the number of rules in a system increases, the difficulty in managing those rules may also increase. For example, it may be difficult to know where to add new rules or to know when conflicting rules are causing erroneous results to be produced by the system. Further, because rules are generally processed and fired in sequential order, the ordering of the rules may grow less optimal as the number of rules continues to grow, thereby decreasing the performance of the system.

Therefore, there is a need for systems, methods, and computer products to optimally manage large rule sets.

SUMMARY

According to several embodiments of the present invention, methods, systems, and computer products for optimally managing large rule sets are disclosed. Rule dependencies of rules within a set of rules may be determined as a function of rules execution frequency data generated from applying the rules over a data set. The rules within the set of rules may be clustered into rules clusters based on the determined rule dependencies, in which the rules clusters comprise disjoint subsets of the rules within the set of rules. Cluster frequency data for the rules clusters may be used to arrive at an optimal ordering. Each rule within the set of rules is assigned a unique identification that captures an execution order of the rules within the set of rules.

DETAILED DESCRIPTION

Figure 1:
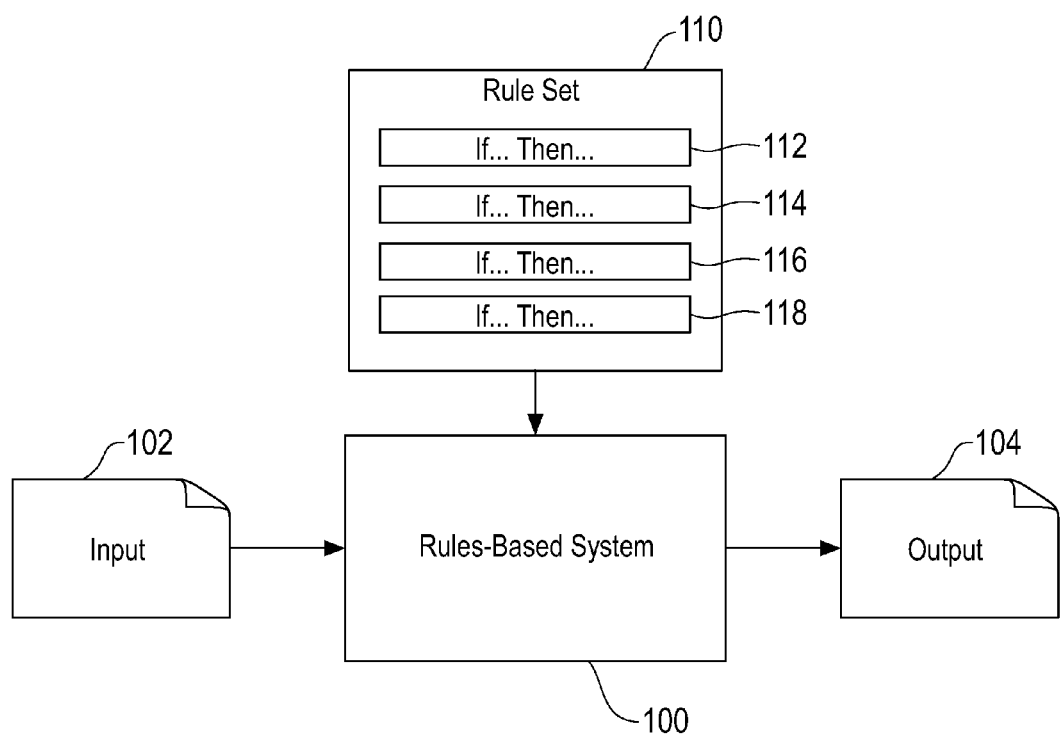
FIG. 1 shows a block diagram of a rule based system in accordance with an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide systems, methods, and computer products for optimally managing large rule sets based on data that may be generated by applying rule sets over sample data sets. The generated data may be used to cluster rules into rules clusters, and the rules clusters may be ordered to produce an optimal ordering of rules for rule sets.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable media having computer readable program code embodied thereon.

Any combination of one or more computer readable media may be utilized. A computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of computer readable storage media would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be executed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to FIG. 1, an exemplary rules-based system 100 takes as an input 102, a data set, and applies rules 112, 114, 116, and 118 within a rule set 110 against that data set to produce an output 104. For example, the input 102 may be a set of addresses that may be parsed by the rules-based system 100 based on the rules 112, 114, 116, and 118 within the rule set 110 into a standardized address format as the output 104.

Each of the rules 112, 114, 116, and 118 may include a condition and an action, such as in an if-then statement, where the action may be executed if the condition evaluates to true. The rules 112, 114, 116, and 118 may be stored sequentially within the rule set 110 and may be processed sequentially when the rule set 110 is applied over the data set. For example, for a given record in the data set, the condition of the first rule 112 within the rule set 110 is evaluated. If the condition of the first rule 112 evaluates to true for that record, then the action of the first rule 112 may be executed. Thus, the first rule 112 is executed if the action of the first rule 112 is executed. On the other hand, if the condition of the first rule evaluates to false for that record, then the action of the first rule 110 may not be executed. After the first rule 112 has been evaluated and/or executed, the second, third, and fourth rules 114, 116, and 118, respectively, are evaluated and/or executed in that order for that record.

Figure 2:
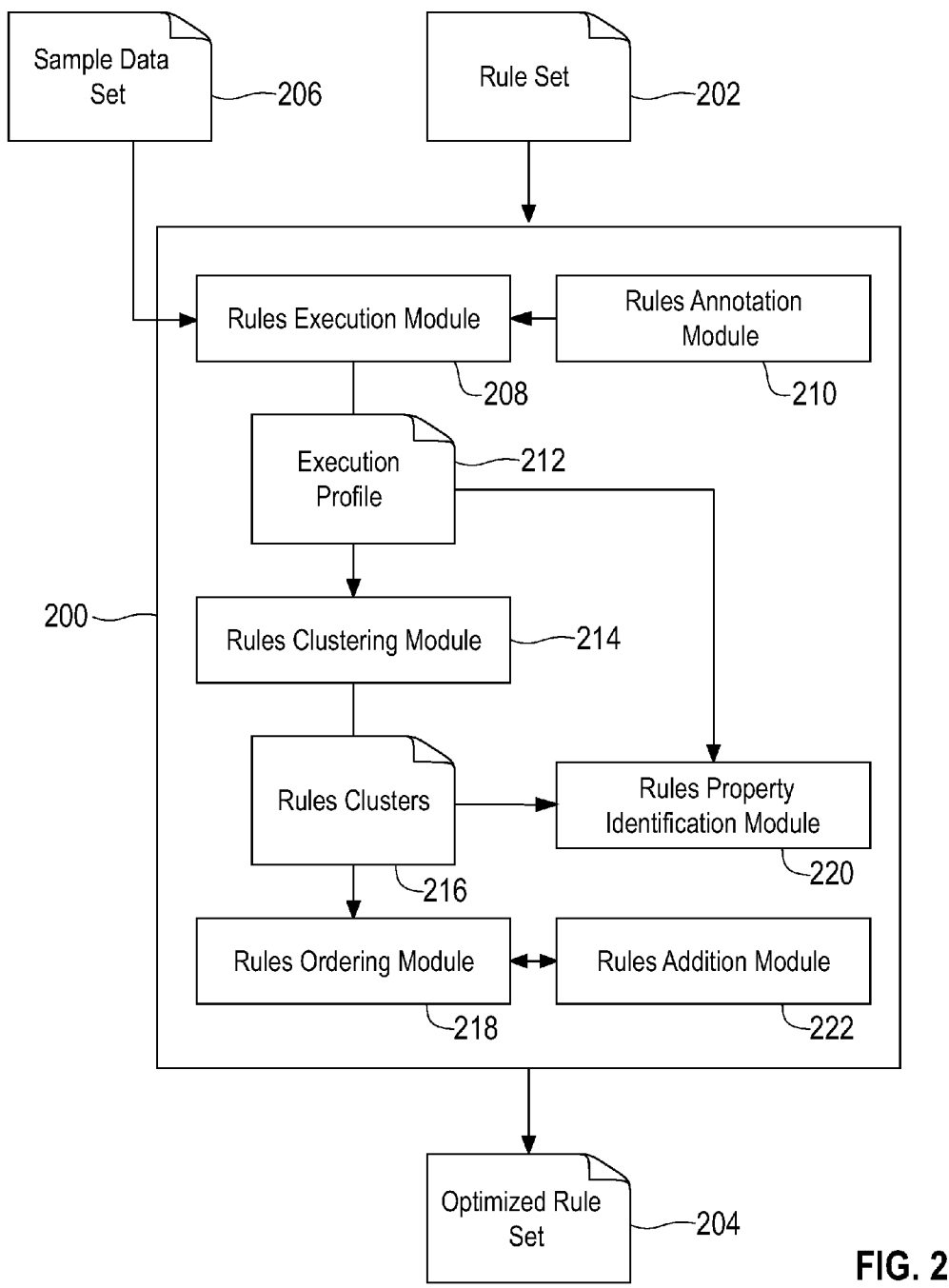
FIG. 2 shows a block diagram of a rule set management system in accordance with an embodiment of the present invention.

With reference now to FIG. 2, because rules within a rule set are evaluated sequentially when applied over a data set, the ordering of the rules within a rule set may significantly affect the performance of the rule set. Thus, an exemplary rules management system 200 has at least one processor and is able to process and re-order the rules within a rule set 202 via modules within the system 200 running on the at least one processor to produce an optimized rule set 204 by following the general principle that rules that fire more frequently should generally be placed closer to the beginning of the rule set 202 than a rule that fires less frequently. The processing and re-ordering of the rules within the rule set 202 may be accomplished by applying the rule set 202 over a sample data set 206 and using an execution profile 212 generated from the application of the rule set 202 over the sample data set 206.

A rules annotation module 210 within the rules management system 200 annotates each rule within the rule set 202 with a unique ID that captures the order in which the rules within the rule set 202 are applied by the rules execution module to the sample data set 206. For example, the first rule within the rule set 202 that is applied to the sample data set 206 is annotated as R1, the second rule within the rule set 202 that is applied to the sample data set 206 is annotated as R2, the third rule within the rule set 202 that is applied to the sample data set 206 is annotated as R3, and so on.

A rules execution module 208 is able to apply and execute the rules within the rule set 202 over the sample data set 206, and generates an execution profile 212 based on the application of the rule set 202 over the sample data set 206. The execution profile 212 generated by the rules execution module 208 captures dependency relationships amongst the rules within the rule set 202. Rules are defined as being dependent on one another if the output of the rules being applied over the same data set changes depending on the order that the rules are applied over the same data set.

To capture the dependency relationships amongst the rules, the rules execution module 208 calculates rule frequencies of the rules within the rule set 202 as a function of applying the rule set 202 over the sample data set 206 as a frequency set S of rule-frequency pairs: $S=\{(r_1,f_1),(r_2,f_2),(r_3,f_3), K\ (r_k,f_k)\}$, where the frequency f for a rule r within the rule set 202 is the number of times that the rule r's condition evaluates to true to cause the rule r's action to execute when the rule set 202 is applied over the sample data set 206.

The rules execution module 208 also calculates a commented set $S_i^c$ of rule-frequency pairs: $S_i^c=\{(r_1,f_1),(r_2,f_2),(r_3,f_3), K\ (r_k,f_k)\}$ for each rule $r_i$ within the rule set 202, where set $S_i^c$ is calculated for each rule $r_i$ by applying the rules within the rule set 202 except for rule $r_i$, which may be accomplished by commenting out or otherwise removing rule $r_i$ from the rule set 202, over the sample data set.

The rules execution module 208 calculates a difference set $S_i^d$ of rule-frequency pairs: $S_i^d=\{(r_1,f_1),(r_2,f_2),(r_3,f_3), K\ (r_n,f_n)\}$ for each rule $r_i$ within the rule set 202 as a difference between the set S of rule-frequency pairs and the commented set $S_i^c$ of rule-frequency pairs.

A rule-frequency pair $(r_i,f_i)$ may be a member of the difference set $S_i^d$ if $((r_i,f_i) \notin S)$ and $(r_i,f_i) \in S_i^c)$ or $((r_i,f_{ic}) \in$ and $(f_{is} \neq f_{ic}))$. Thus, a frequency pair may be a member of the different set $S_i^d$ if the rule-frequency pair exists in the commented set $S_i^c$ but not the frequency set S, or the frequency pair may be a member of the different set $S_i^d$ if the rule in the rule-frequency set is paired up with two different frequencies as frequency-sets in the frequency set S and the commented set $S_i^c$.

Figure 3:
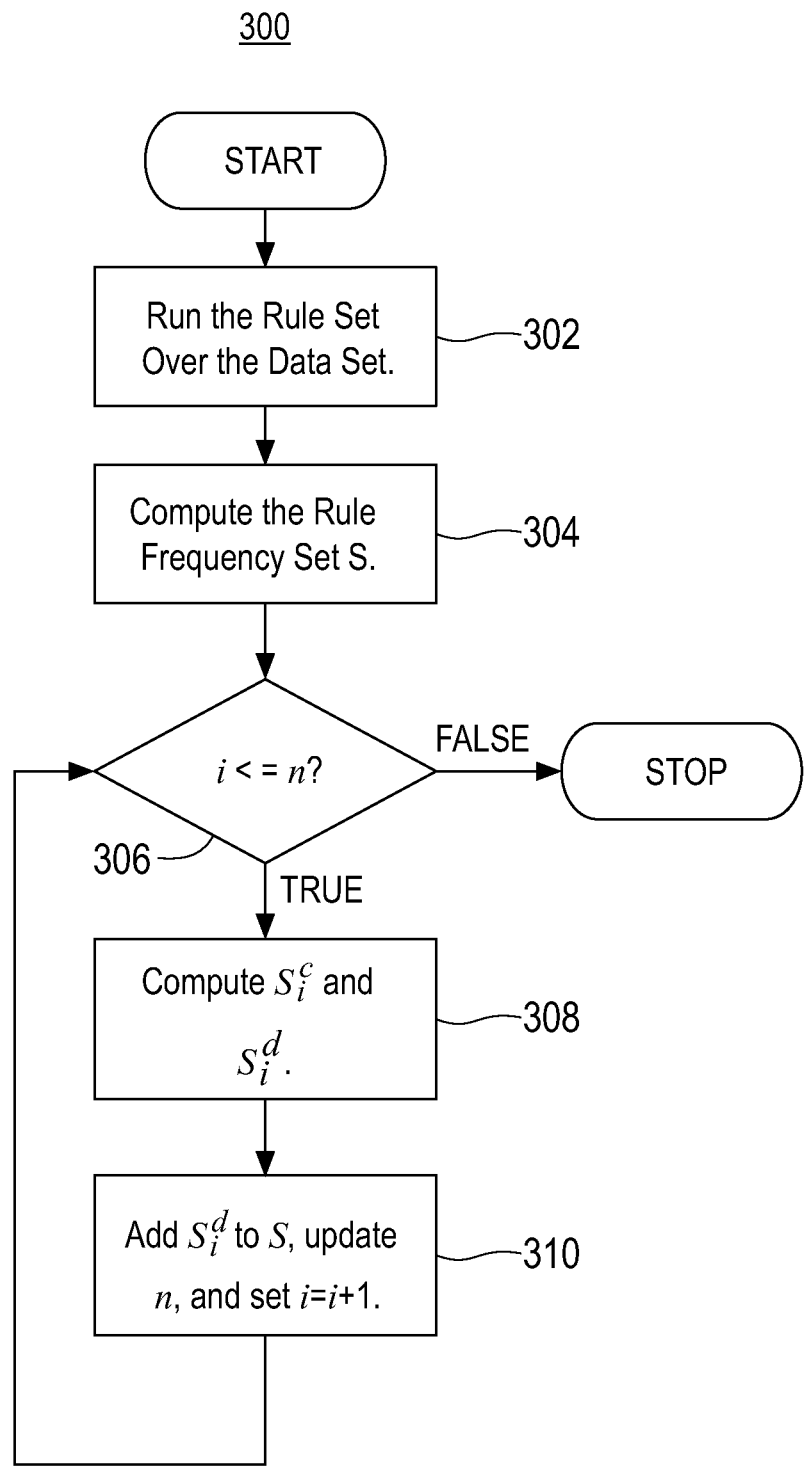
FIG. 3 shows a flowchart of a method for generating an execution profile in accordance with an embodiment of the present invention.

The execution profile 212 generated by the rules execution module 208 may include data regarding the frequency set S, the commented set $S_i^c$, and the difference set $S_i^d$. The process of generating the execution profile 212 by the rules execution module 208 is illustrated by FIG. 3, which shows a flowchart 300 of a method for generating the execution profile 212. At step 302, the rule set 202 is applied over the sample data set 206. At step 304, the rule frequency set S is computed. At step 360, if i is bigger than n, where n is the number of rule-frequency pairs in the rule frequency set S, then the method ends. Otherwise, at step 308, the commented set $S_i^c$ as well as the different set $S_i^d$ for rule $r_i$ is computed. At 310, the different set $S_i^d$ is added to the rule frequency set S, n is updated, and i is incremented. The method then returns to step 306 for further processing.

With reference now back to FIG. 2, the rules clustering module 214 is able to cluster the rules in the rule set 202 into rules clusters 216 based on data within the execution profile 212, specifically the difference set difference set $S_i^d$ calculated for each rule $r_i$.

Figure 4:
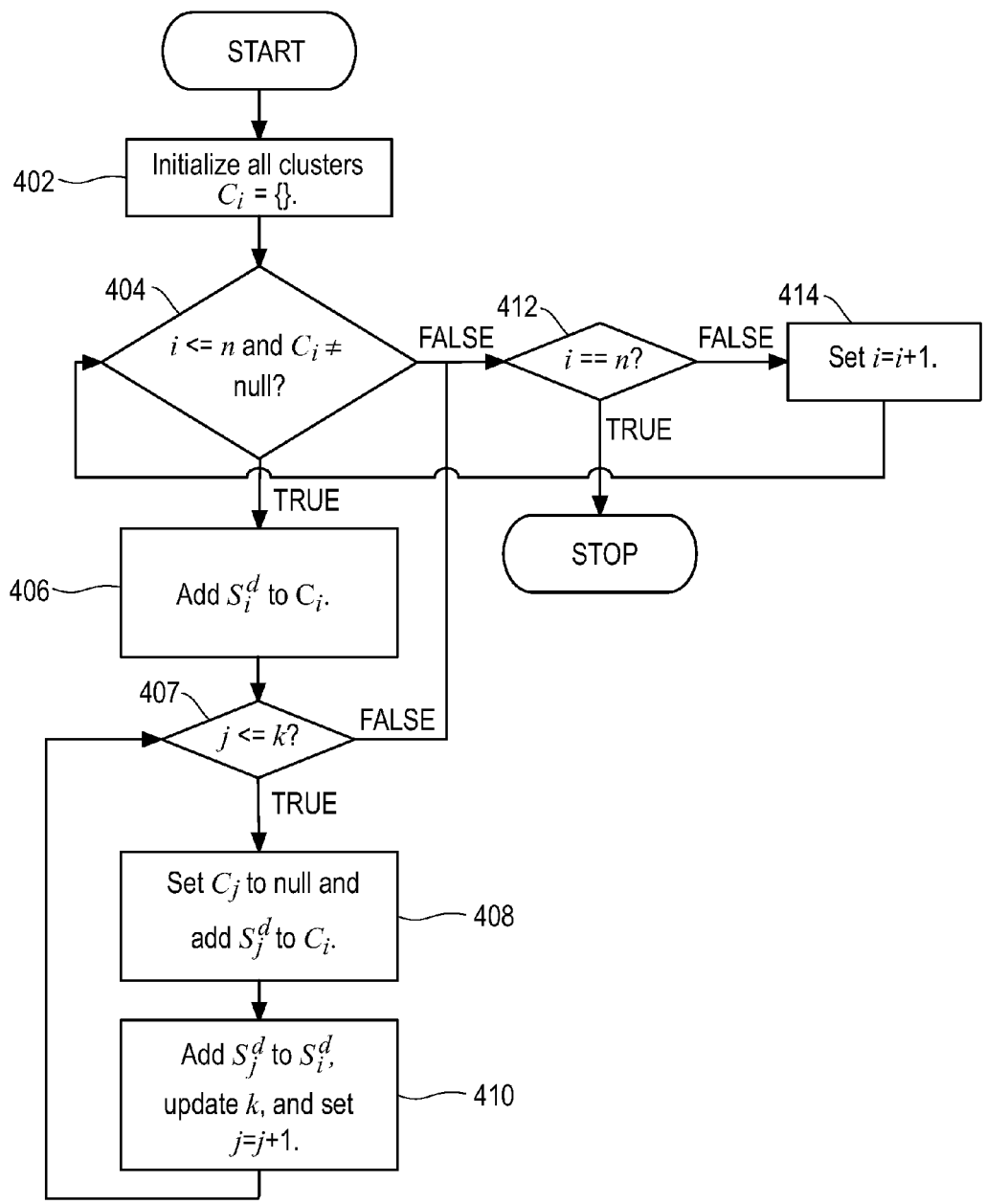
FIG. 4 shows a flowchart of a method for creating rules clusters in accordance with an embodiment of the present invention.

The process of clustering the rules by the rules clustering module 214 is illustrated by FIG. 4, which shows a flowchart 400 of a method for creating rules clusters. At step 402, all clusters $C_i$ where $1<=i<=n$, and n is the number of rules within a rule set, are initialized so that they are empty. At step 404, it is determined whether $i<=n$ and $C_i \neq null$. If the determination evaluates to false, it is determined at step 412 whether i==n. If i==n, it means that all of the rules in the rule set have been clustered, and the process ends. Otherwise, at step 414 i is incremented and the process returns to step 404.

If the determination at step 404 resolves to true, elements of the difference set $S_i^d$ for rule $r_i$ is added at step 406 to cluster $C_i$. The difference set $S_i^d$ for rule $r_i$ includes rules $r_j$, where $i<j<=k$. At step 407, it is determined whether $j<=k$. If the determination evaluates to false, the process continues with step 412, as explained above.

If the determination at step 407 evaluates to true, at step 408 cluster $C_j$ is set to null and the elements of difference set $S_j^d$ for rule $r_j$ are added to cluster $C_j$. At step 410, the elements of difference set $S_j^d$ for rule $r_j$ are added to the difference set $S_i^d$ for rule $r_i$, the number k is updated, and j is incremented. The method then returns back to step 407.

By executing the method illustrated, rules are clustered into rules clusters based upon the calculated difference set $r_i$. The rules cluster may be disjoint subsets of the rule set. Thus, a rule within the rule set may only be a member of one rules cluster within the rules clusters. Within each of the rules cluster, the rules that are members of the rules cluster may be ordered to resolve dependencies between the member rules. For example, for rules R1 and R2, if R2 depends on R1, then R2 may be ordered after R1 within the rules cluster.

With reference now back to FIG. 2, the rules property identification module 220 is able to identify unreachable rules, duplicate rules, and conflicting rules within the rule set 202 based on the execution profile 212 generated by the rules execution module 208 and/or the rules clusters 216 generated by the rules clustering module 214. An unreachable rule is identified as a rule whose condition did not evaluate to true even once as the rule set 202 was applied to the sample data set 206, and thus is not within any one of the rules clusters 216. A set of duplicate rules $r_i$ and $r_j$ is identified if $(r_j, f_j) \in S_i^c, f_i = f_j$, and $S_i^j - (r_j, f_i) = S - (r_i, f_i)$. A set of conflicting rules $r_i$ and $r_j$ within the same rules cluster is identified if, for a given input record, rules $r_i$ and $r_j$, when applied over the given input record, produce different outputs. When unreachable, duplicate, and conflicting rules have been identified, those rules may be pruned or otherwise removed. For example, given a set of duplicate rules, all except one of the duplicate rules may be removed. Likewise, given a set of conflicting rules, one or more of the conflicting rules may also be removed.

The rules ordering module 218 is able to order the rules clusters 216 by calculating a cluster frequency for each of the rules clusters 216 and comparing the calculated cluster frequencies. A cluster frequency for a rules cluster is calculated by summing all of the rules frequencies for each member rule within the rules cluster. The rules ordering module 218 may then order the rules clusters 216 in descending order of cluster frequencies to produce an optimized rule set 204. If the rule set 202 contains any unreachable rules as identified by the rules property identification module 220, those unreachable rules are placed at the end of the optimized rule set 204 or are excluded from the optimized rule set 204 altogether.

The rules addition module 222 is able to add a new rule to the optimized rule set 204. If there is a dependency between the new rule and an existing rule, the new rule is inserted into the same rules cluster as that existing rule. Otherwise, a new rules cluster is created with the new rule as its only member. The cluster frequencies of the non-updated rules clusters 216 is then recalculated by the rules ordering module 218 and an updated optimized rule set 204 is arranged based on the recalculated cluster frequencies.

Periodically, the rules management system 200 produces a new optimized rule set 204, including calculating new rules clusters 216 from a new execution profile 212 generated by applying the rule set 202 over the sample data set 206. For example, the rules management system 200 may produce a new optimized rule set 204 after a certain time interval or after a certain number of new rules have been added to the rule set 202. Alternatively, the rules management system 200 may produce a new optimized rule set 204 if performance of the system 200 degrades, or if the characteristics of the data operated on by the rule set 202 changes, which may occur if the rule set 202 is moved from one customer to another customer.

To further illustrate the production of an optimized rule set, consider an exemplary rule set for parsing street addresses which contains the following exemplary rules:

| Rule ID | Rules |
| --- | --- |
| R1 | IF a number is preceded by FLAT, THEN move number to DOOR field |
| R2 | IF two tokens are followed by ROAD or STREET THEN move two tokens to STREET NAME field and ROAD/STREET to STREET TYPE field |
| R3 | IF a token is followed by ROAD or STREET THEN move the token to STREET NAME field and ROAD/STREET to STREET TYPE field |
| R4 | IF a number-alphabet is present in the string starting from right to left THEN move it to DOOR field |
| R5 | IF a number is present in the string scanning from left to right THEN move the number to DOOR field |
| R6 | IF a 6-digit number is present in the string scanning from right to left THEN move it to PINCODE field |
| R7 | IF two tokens are followed by NAGAR THEN move them to AREA field and NAGAR to AREATYPE field |
| R8 | IF a token is followed by NAGAR THEN move the token to AREA field and NAGAR to AREATYPE field |
| R9 | IF a ROAD/STREET token is followed by a number THEN move the number to STREET BANE field and then ROAD/STREET to STREET TYPE field |

As shown, the rules are each annotated with a unique rule ID from R1 to R9 that captures the execution order of the rules. The rule set shown above may operate on a sample data set containing the following addresses:

| | Addresses |
|---|---|
| Address 1 | FLAT 56 PARK ROAD LAXMI NAGAR 400001 |
| Address 2 | 46 MAHATMA GANDHI ROAD RAMA KRISHNA PURAM 400024 |
| Address 3 | 42 PARK STREET LAXMI NAGAR 400001 |
| Address 4 | 46-A PARK STREET LAXMI NAGAR 40001 |

As the rule set is applied to the sample data set, the conditions of rules R1, R3, R6, and R8 evaluate to true for address 1 and thus execute their actions on address 1, the conditions of rules R2, R5, R6, and R7 evaluate to true for address 2 and thus execute their actions on address 2; the conditions of rules R3, R5, R6, and R8 evaluate to true for address 3 and thus execute their actions on address 3; and the conditions of rules R3, R4, R6, and R8 evaluate to true for address 4 and thus execute their actions on address 4.

The number of times that the conditional part of each rule evaluates to true while the rule set is applied over the four addresses of the sample data set may be expressed by the frequency set S as follows:

$$S = \{(R1,1), (R2,1), (R3,3), (R4,1), (R5,2), (R6,4), (R7,1), (R8,3)\}$$

As can be seen in the frequency set S, the conditional part of rule R9 did not evaluate to true even once when applied over the sample data set. Thus, rule R9 may be considered an unreachable rule.

The commented frequency set $S_i^c$ and the difference set $S_i^d$ for the reachable rules R1 and R8 may also be calculated as follows:

$S_1^c = \{(R2, 1), (R3, 3), (R4, 1), (R5, 3), (R6, 4), (R7, 1), (R8, 3)\}$, $S_1^d = \{(R1, 1), (R5, 3)\}$
$S_2^c = \{(R1, 1), (R3, 4), (R4, 1), (R5, 2), (R6, 4), (R7, 1), (R8, 3)\}$, $S_2^d = \{(R2, 1), (R3, 4)\}$
$S_3^c = \{(R1, 1), (R2, 1), (R4, 1), (R5, 2), (R6, 4), (R7, 1), (R8, 3)\}$, $S_3^d = \{(R3, 3)\}$
$S_4^c = \{(R1, 1), (R2, 1), (R3, 3), (R5, 3), (R6, 4), (R7, 1), (R8, 3)\}$, $S_4^d = \{(R4, 1), (R5, 3)\}$
$S_5^c = \{(R1, 1), (R2, 1), (R3, 3), (R4, 1), (R6, 4), (R7, 1), (R8, 3)\}$, $S_5^d = \{(R5, 2)\}$
$S_6^c = \{(R1, 1), (R2, 1), (R3, 3), (R4, 1), (R5, 2), (R7, 1), (R8, 3)\}$, $S_6^d = \{(R6, 1)\}$
$S_7^c = \{(R1, 1), (R2, 1), (R3, 3), (R4, 1), (R5, 2), (R6, 4), (R8, 4)\}$, $S_7^d = \{(R7, 1), (R8, 4)\}$
$S_8^c = \{(R1, 1), (R2, 1), (R3, 3), (R4, 1), (R5, 2), (R6, 4), (R7, 1)\}$, $S_8^d = \{(R8, 3)\}$

Figure 5:
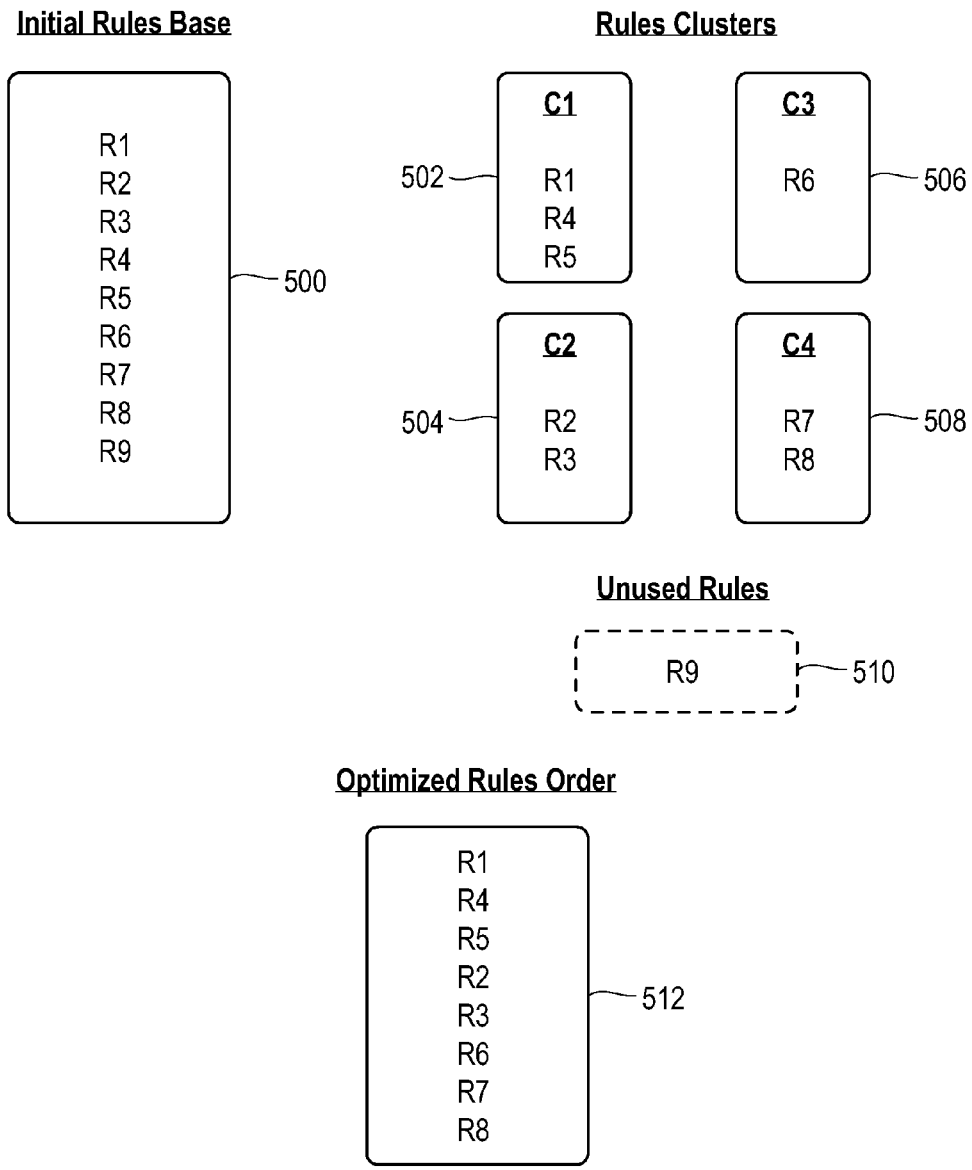
FIG. 5 shows a block diagram of rules clusters in accordance with an embodiment of the present invention.

With reference now to FIG. 5, which shows a block diagram illustrating the rules clusters, the rules clusters for the rule set having an initial rules base 500 of rules R1 to R9 are calculated based on the calculated difference set $S_i^d$ for the reachable rules R1 to R8. As shown in $S_1^d$, rule R1 has a dependency relationship with rule R5 because they are both contained within $S_1^d$, while $S_4^d$ shows that rule R4 has a dependency relationship with rule R5 because both rules R4 and R5 are contained within $S_4^d$. Furthermore, $S_5^d$ contains only rule R5, and thus does not show any other dependency relationships of rule R5. Thus, because rule R1 has a dependency relationship with Rule R5, and because rule R4 also has a dependency relationship with rule R5, a rules cluster C1 502 is formed to include rules R1, R4, and R5, thereby capturing those dependency relationships. Further, $S_2^d$ shows that rule R2 has a dependency relationship with rule R3 while $S_3^d$ shows that rule R3 does not have any further dependency relationships with any other rule. Thus, a rules cluster C2 504 is formed to include rules R2 and R3 to capture the dependency relationships of rules R2 and R3. As also shown in $S_6^d$, rule R6 does not have a dependency relationship with another rule. Thus, a rules cluster C3 506 is formed to include only rule R6. Finally, as shown in $S_7^d$, rule R7 has a dependency relationship with R8 while $S_8^d$ sows that rule R8 does not have any further dependency relationships with any other rule. Thus, a rules cluster C4 508 is formed to include rules R7 and R8 to capture their dependency relationship.

The clustered rules within the rules clusters C1 502, C2 504, C3 506, and C4 508 are ordered within the rules clusters to resolve their dependencies. For example, because $S_1^d$ shows that rule R5 depends on rule R1 and because $S_4^d$ shows that rule R5 also depends on R4, the rules within cluster C1 502 are ordered sequentially as R1, R4, and R5, so that R5 is applied after the two rules, R1 and R4, that R5 depends on have been applied.

The rules clusters C1 502, C2 504, C3 506, and C4 508 are ordered in descending order based on the cluster frequency of each of the rules clusters. In this case, each of the rules clusters C1 502, C2 504, C3 506, and C4 508 has a cluster frequency of 4. Thus, an optimized rule set may simply order the rules clusters sequentially as C1 502, C2 504, C3 506, and C4 508, leading to an optimized rules order 512 of R1, R4, R5, R2, R3, R6, R7, and R8.

As discussed above, because the condition of rule R9 never once evaluated to true when the rule set was applied over the sample data set, rule R9 is considered an unreachable rule 510. Thus, rule R9 is placed at the end of the optimized rule set after the four clusters of rules or may not be included in the optimized rule set at all.

Figure 6:
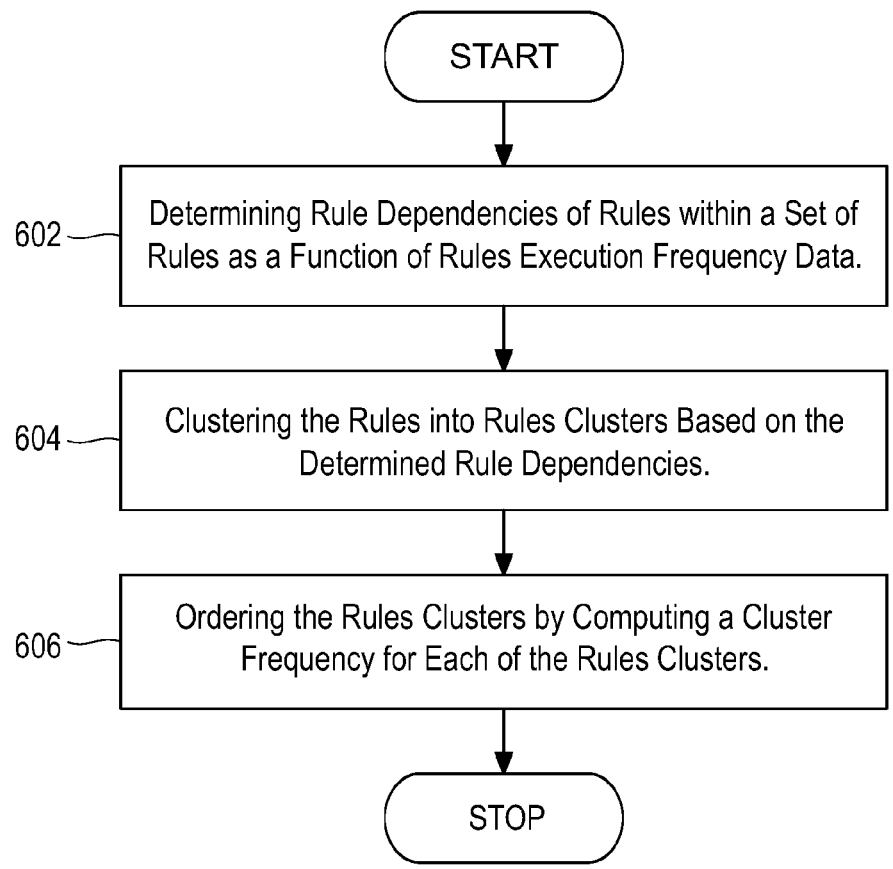
FIG. 6 shows a flowchart of a method for identifying rules clusters within a set of rules in accordance with an embodiment of the present invention.

With reference to FIG. 6, a flowchart 600 illustrates an exemplary method for identifying rules clusters within a set of rules. At 602, rule dependencies of rules within a set of rules are determined as a function of rules execution frequency data. Such data is generated from applying the rules over a data set. At 604, the rules are clustered into rules clusters based on the determined rule dependencies, where the rules clusters comprise disjoint subsets of the rules within the set of rules. At 606, the rules clusters are ordered by computing a cluster frequency for each of the rules clusters.

Figure 7:
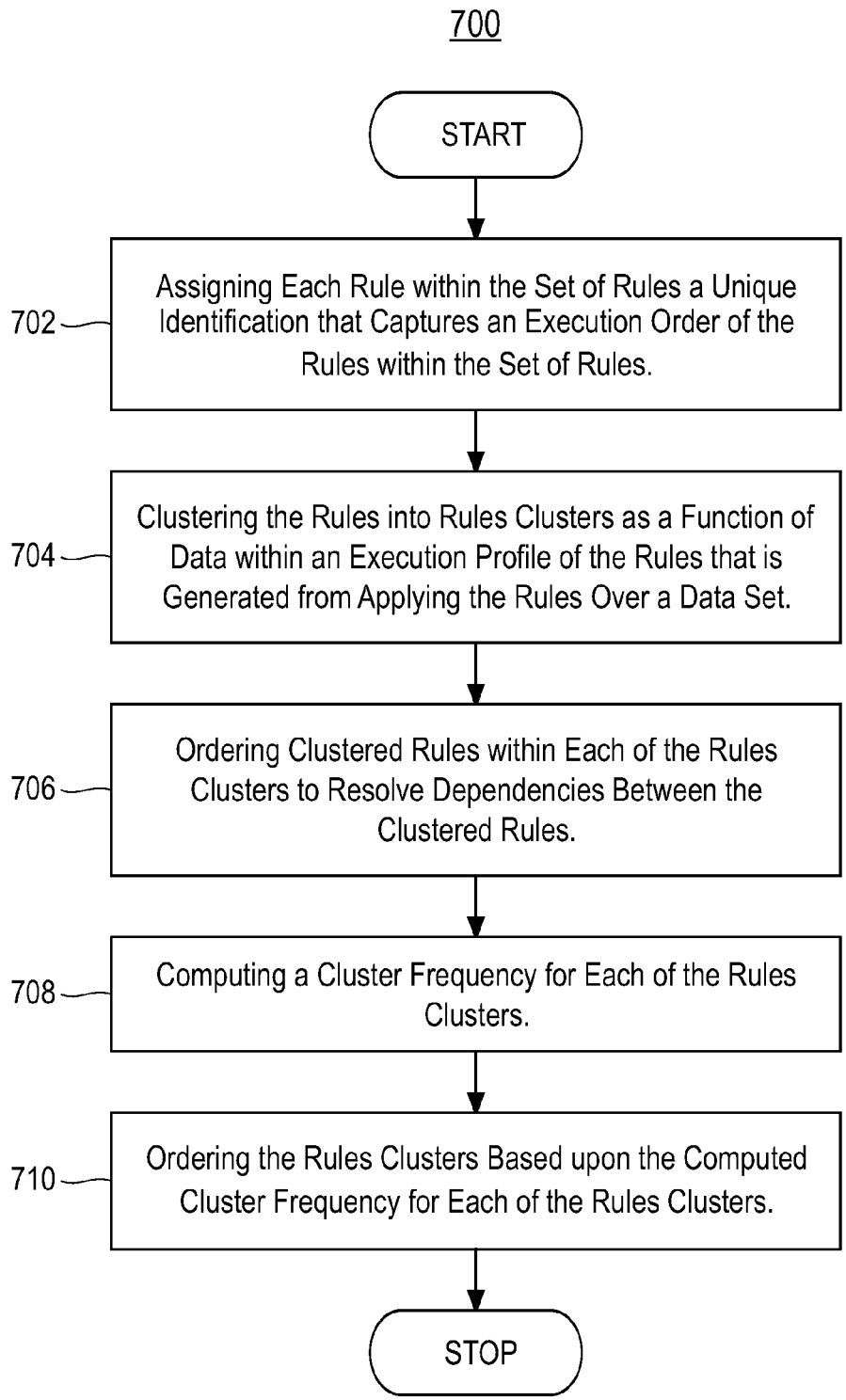
FIG. 7 shows a flowchart of a method for ordering rules within a set of rules in accordance with an embodiment of the present invention.

With reference to FIG. 7, a flowchart 700 illustrates an exemplary method for ordering rules within a set of rules which are based on the identification of rules clusters as illustrated in FIG. 6. At 702, each rule within the set of rules is assigned a unique identification that captures an execution order of the rules within the set of rules. At 704, the rules are clustered into rules clusters as a function of data within an execution profile of the rules that is generated from applying the rules over a data set. At 706, the clustered rules within each of the rules clusters are ordered to resolve dependencies between the clustered rules. At 708, a cluster frequency is computed for each of the rules clusters. At 710, the rules clusters are ordered based upon the computed cluster frequency for each of the rules clusters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that execute the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for executing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing a set of rules, comprising:
    determining rule dependencies of rules within the set of rules as a function of rules execution frequency data generated from applying the rules over a data set;
    clustering the rules into rules clusters based on the determined rule dependencies, wherein the rules clusters comprise disjoint subsets of the rules within the set of rules;
    ordering the rules clusters based on a cluster frequency for the rules clusters; and
    identifying conflicting rules $r_i$ and $r_j$ within a rules cluster within the rules clusters if $r_i$ and $r_j$ produce different outputs when applied to a same data set.

2. The method of claim 1, wherein the determining of the rule dependencies comprises:
    calculating a first set of rule-frequency pairs $S=\{(r_1,f_1),(r_2,f_2),(r_3,f_3),K\ (r_k,f_k)\}$ as a function of the applying the rules over the data set;
    for each rule $r_i$ within the set of rules, calculating a commented set of rule-frequency pairs $S_i^c=\{(r_1,f_1),(r_2,f_2),(r_3,f_3),K\ (r_k,f_k)\}$ for that rule $r_i$ as a function of applying the rules within the set of rules except for that rule $r_i$ over the data set;
    for each rule $r_i$ within the set of rules, calculating a difference set of rules $S_i^d=\{(r_1,f_1),(r_2,f_2),(r_3,f_3),K\ (r_n,\ f_n)\}$ from the first set of rule-frequency pairs and the commented set of rule-frequency pairs for that rule, wherein $((r_i,f_i)\notin S)$ and $(r_i,f_i)\in S_i^c)$ or $((r_i,f_{ic})\notin S_i^c$ and $(f_{is}\neq f_{ic}))$; and
    determining the rule dependencies from the calculated difference set of rules for each rule with in the set of rules.

3. The method of claim 2, wherein the rules execution frequency data comprise the first set of rule-frequency pairs S, the commented set of rule-frequency pairs $S_i^c$ for each rule $r_i$ within the set of rules, and the difference set of rules $S_i^d$ for each rule $r_i$ within the set of rules.

4. The method of claim 2, including identifying duplicate rules $r_i$ and $r_j$ if $(r_j,f_j)\notin S_i^c$, $f_i=f_j$, and $S_i^c-(r_j,f_j)=S-(r_i,f_i)$.

5. The method of claim 1, including:
    inserting a new rule into a rule cluster within the rules clusters if there is a dependency between the new rule and a rule within the rule cluster; and
    creating a new rule cluster comprising the new rule if there is not a dependency between the new rule and another rule within the rule clusters.

6. The method of claim 1, including identifying an unreachable rule as a rule not within any one of the rule clusters.

7. The method of claim 1, including assigning each rule within the set of rules a unique identification that captures an execution order of the rules within the set of rules.

8. The method of claim 1, wherein the ordering includes computing the cluster frequency for each of the rules clusters by summing a frequency for each clustered rule in a rules cluster to determine the cluster frequency for the rules cluster.

9. A rules management system having at least one processor, comprising:
    a rules execution module executing on the at least one processor for applying rules within a set of rules over a data set and generating rule dependency data for the rules from the executing to determine rule dependencies of the rules;
    a rules clustering module executing on the at least one processor for clustering the rules into rules clusters based on the determined rule dependencies, wherein the rules clusters comprise disjoint subsets of the rules;
    a rules ordering module executing on the at least one processor for ordering the rules clusters based on a cluster frequency for the rules clusters; and
    a rules property identification module executing on the at least one processor for identifying an unreachable rule, a duplicate rule, and conflicting rules $r_i$ and $r_j$ from the rules within the set of rules,
    wherein the rules property identification module is operable to identify the conflicting rules $r_i$ and $r_j$ within a single rules cluster within the rules clusters if $r_i$ and $r_j$ produce different outputs when applied to a same data set.

10. The rules management system of claim 9, wherein the execution module is operable to generate the execution profile by:
    calculating a first set of rule-frequency pairs $S=\{(r_1,f_1),(r_2,f_2),(r_3,f_3),K\ (r_k,f_k)\}$ as a function of the applying the rules over the data set;
    for each rule $r_i$ within the set of rules, calculating a commented set of rule-frequency pairs $S_i^c=\{(r_1,f_1),(r_2,f_2),(r_3,f_3),K\ (r_k,f_k)\}$ for that rule $r_i$ as a function of applying the rules within the set of rules except for that rule $r_i$ over the data set; and
    for each rule $r_i$ within the set of rules, calculating a difference set of rules $S_i^d=\{(r_1,f_1),(r_2,f_2),(r_3,f_3),K\ (r_n,f_n)\}$ from the first set of rule-frequency pairs and the commented set of rule-frequency pairs for that rule, wherein $((r_i,f_i)\notin S)$ and $(r_i,f_i)\in S_i^c)$ or $((r_i,f_{ic})\in S_i^c$ and $(f_{is}\neq f_{ic}))$.

11. The rules management system of claim 9, wherein the cluster frequency for each rules cluster of the rules clusters is a sum of a frequency of execution over the data set of each cluster rule within the rules cluster.

12. The rules management system of claim 9, wherein the rules property identification module is operable to identify the unreachable rule by identifying a rule within the set of rules that is not clustered into any one rules cluster within the rules clusters.

13. The rules management system of claim 9, including a rules annotation module executing on the at least one processor for annotating each rule within the set of rules with a unique identification that captures an execution order of the rules within the set of rules.

14. The rules management system of claim 9, including a rules addition module executing on the at least one processor for inserting a new rule into a rule cluster within the rules clusters if there is a dependency between the new rule and a rule within the rule cluster and for creating a new rule cluster comprising the new rule if there is not a dependency between the new rule and another rule within the rule clusters.

15. A computer program product comprising a non-transitory computer readable storage medium having computer readable program code embodied therewith, the computer readable program code comprising:

computer readable code configured to determine rule dependencies of rules within a set of rules as a function of rules execution frequency data generated from applying the rules over a data set;

computer readable code configured to cluster the rules into rules clusters based on the determined rule dependencies, wherein the rules clusters comprise disjoint subsets of the rules within the set of rules;

computer readable code configured to order the rules clusters based on a cluster frequency for the rules clusters;

computer readable code configured to identify an unreachable rule within the set of rules;

computer readable code configured to identify a duplicate rule within the set of rules; and computer readable code configured to identify conflicting rules from the rules within the set of rules.

16. The computer program product of claim 15, wherein the computer readable program code configured to cluster the rules comprises:

computer readable code to calculate a first set of rule-frequency pairs $S=\{(r_1,f_1),(r_2,f_2),(r_3,f_3),K\ (r_k,f_k)\}$ as a function of the applying the rules over the data set;

computer readable code to, for each rule $r_i$ within the set of rules, calculate a commented set of rule-frequency pairs $S_i^c=\{(r_1,f_1),(r_2,f_2),(r_3,f_3),K\ (r_k,f_k)\}$ for that rule $r_i$ as a function of applying the rules within the set of rules except for that rule $r_i$ over the data set; and computer readable code to, for each rule $r_i$ within the set of rules, calculate a difference set of rules $S_i^d=\{(r_1,f_1),(r_2,f_2),(r_3,f_3),K\ (r_n,f_n)\}$ from the first set of rule-frequency pairs and the commented set of rule-frequency pairs for that rule, wherein $((r_i,f_i)\notin S)$ and $(r_i,f_i)\in S_i^c)$ or $((r_i,f_{ic})\in S_i^c$ and $(f_{is}\neq f_{ic}))$.

17. The computer program product of claim 15, wherein the computer readable code configured to order the rules clusters includes:

computer readable code configured to compute the cluster frequency for each of the rules clusters; and computer readable code configured to order the rules clusters based on the computed cluster frequency for at least one the rules clusters.

18. The computer readable product of claim 17, wherein the computer readable code configured to compute the cluster frequency includes computer readable program code configured to sum a frequency for each cluster rule in a rules cluster to determine the cluster frequency for the rules cluster.

19. The computer program product of claim 15, including:

computer readable code configured to insert a new rule into a rule cluster within the rules clusters if there is a dependency between the new rule and a rule within the rule cluster; and computer readable code configured to create a new rule cluster comprising the new rule if there is not a dependency between the new rule and another rule within the rule clusters.

20. The computer program product of claim 15, including computer readable code configured to assign to each rule within the set of rules a unique identification that captures an execution order of the rules within the set of rules.

21. The computer program product of claim 15, including computer readable code configured to periodically re-cluster the rules into new rules clusters.

\* \* \* \* \*